(12) United States Patent
Yu

(10) Patent No.: US 7,428,114 B2
(45) Date of Patent: Sep. 23, 2008

(54) VARIABLE FOCAL LENGTH LENS SYSTEM

(75) Inventor: Tai-Cherng Yu, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 215 days.

(21) Appl. No.: 11/307,735

(22) Filed: Feb. 19, 2006

(65) Prior Publication Data

US 2006/0245073 A1 Nov. 2, 2006

(30) Foreign Application Priority Data

Apr. 15, 2005 (CN) ............. 2005 1 0034295

(51) Int. Cl.
*G02B 7/02* (2006.01)

(52) U.S. Cl. ...................... 359/822; 359/819

(58) Field of Classification Search .......... 359/811, 359/819, 824, 822

See application file for complete search history.

(56) References Cited

U.S. PATENT DOCUMENTS 4,678,899 A 7/1987 Baba
6,961,193 B2* 11/2005 Kang et al. ............. 359/824

* cited by examiner

*Primary Examiner*—William C Choi
(74) *Attorney, Agent, or Firm*—Winston Hsu

(57) ABSTRACT

This invention relates to a variable focal length lens system including a deformable lens and a piezoelectric device surrounding the deformable lens. The piezoelectric device is configured for exerting a radial inward or outward force to the deformable lens so as to deform the deformable lens, thereby changing a focal length thereof.

8 Claims, 2 Drawing Sheets

VARIABLE FOCAL LENGTH LENS SYSTEM

FIELD OF THE INVENTION

This invention relates generally to optical lens assemblies, more particularly, to a variable focal length lens system.

DESCRIPTION OF RELATED ART

Generally, a variable focal length lens system includes a plurality of lenses, and an effective focal length thereof can be adjusted by varying the relative spacing between the lenses along an optical axis. Referring to FIG. 2, a conventional variable focal length lens system 100 includes a first lens 102, and a second lens 104. The first lens 102 and the second lens 104 are aligned with along a common optical axis. The first lens 102 is received inside a movable barrel 106, and the second lens 104 is received inside a stationary barrel 108. The movable barrel 106 is adjustably movable relative to the stationary barrel 108. The relative spacing between the first lens 102 and the second lens 104 can be adjusted by moving the movable barrel 106 forward and backward along the optical axis, thereby an effective focal length of the variable focal length lens system is adjusted. However, the conventional variable focal length lens system needs more space available for movements of the lenses, which makes the variable focal length lens system awkwardly and bulky.

What is needed, therefore, is to provide an improved variable focal length lens system.

SUMMARY OF INVENTION

A preferred embodiment provides a variable focal length lens system including a deformable lens and a piezoelectric device surrounding the deformable lens. The piezoelectric device is configured for exerting a radial inward or outward force so as to deform the deformable lens, thereby changing a focal length thereof.

Compared with the conventional variable focal length lens system, the variable focal length lens system in accordance with a preferred embodiment performs a zoom function by varying the focal length of the deformable lens thereof, which makes the variable focal length lens system be compact.

Other advantages and novel features will become more apparent from the following detailed description of embodiments when taken in conjunction with the accompanying drawings.

BRIEF DESCRIPTION OF DRAWINGS

Many aspects of the variable focal length lens system can be better understood with reference to the following drawings. The components in the drawings are not necessarily to scale, the emphasis instead being placed upon clearly illustrating the principles of the present variable focal length lens system. Moreover, in the drawings, like reference numerals designate corresponding parts throughout the several views.

Figure 1:
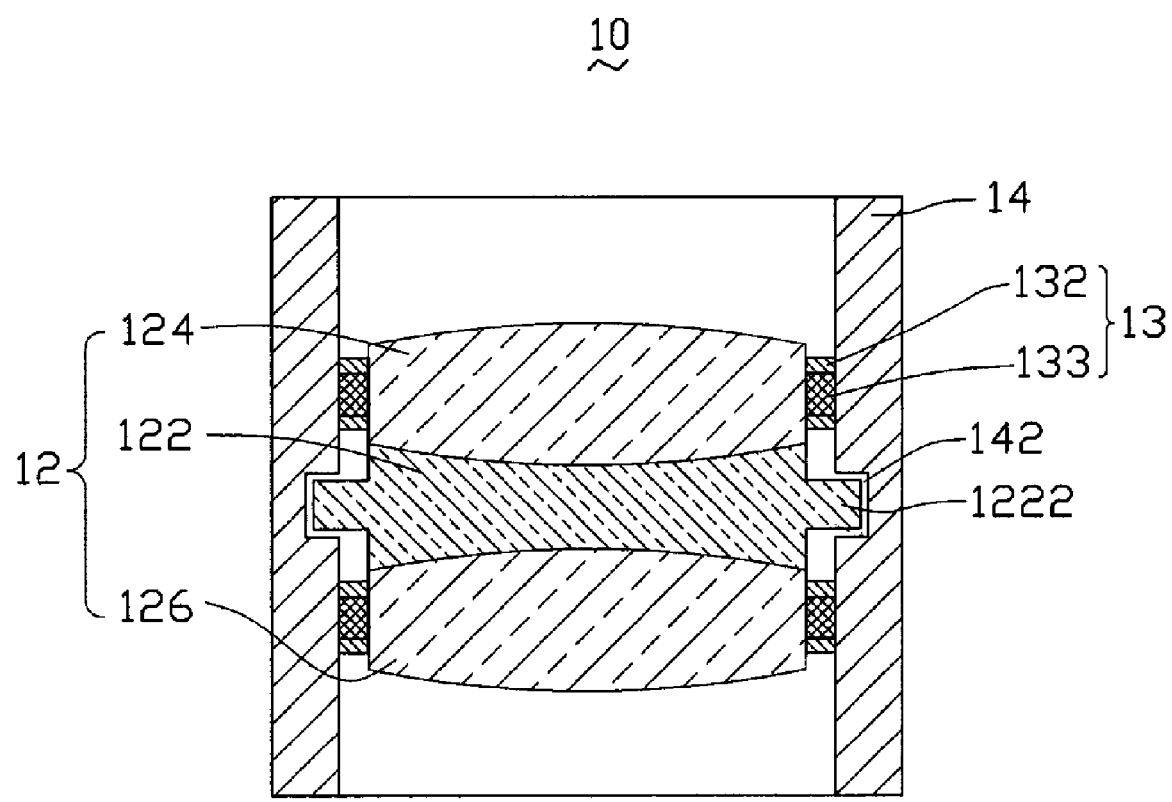
FIG. 1 is a schematic, cross-sectional view of a variable focal length lens system in accordance with a preferred embodiment.
Figure 2:
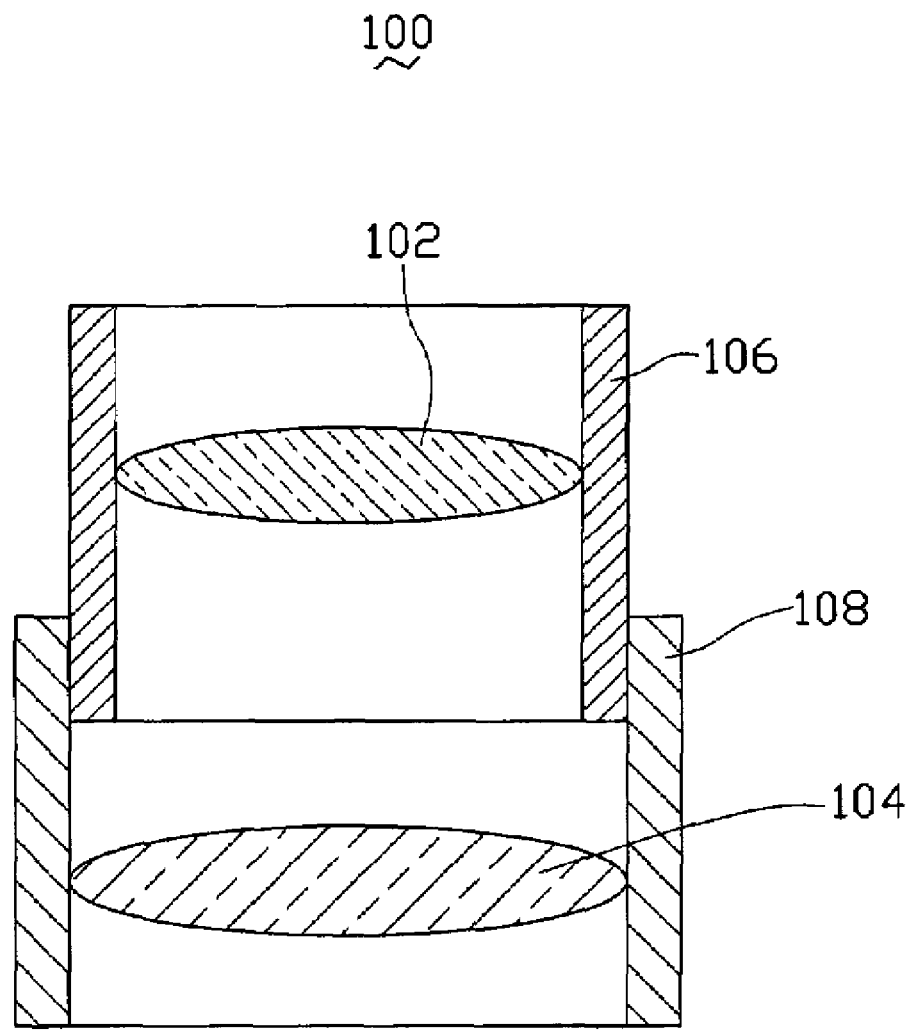
FIG. 2 is a schematic, cross-sectional view of a conventional variable focal length lens system.

The exemplifications set out herein illustrate at least one preferred embodiment of the variable focal length lens system, in one form, and such exemplifications are not to be construed as limiting the scope of the invention in any manner.

DETAILED DESCRIPTION

Reference will now be made to the drawing figures to describe the present variable focal length lens system in detail.

Referring to FIG. 1, a variable focal length lens system 10 in accordance with a preferred embodiment is shown. The variable focal length lens system 10 includes a deformable lens 12, a number of piezoelectric devices 13, and a barrel 14. The barrel 14 has an inner space receiving the lens 12 and the piezoelectric devices 13 therein. Upon being applied with a voltage, the piezoelectric devices 13 can exert a radial inward or outward force onto the deformable lens 12. The deformable lens 12 is thus deformed. This deformation of the deformable lens 12 results in a change in the focal length thereof. Accordingly, an effective focal length of the variable focal length lens system 10 is adjusted.

In the illustrated embodiment, the deformable lens 12 is a composite lens. The composite lens includes a base lens 122 having a first lens surface and an opposite second lens surface, and two plastic lenses 124, 126. The base lens can be a glass lens. The plastic lens 124 is attached on the first lens surface of a base lens 122 by means of a hot embossing process, and surrounded by one piezoelectric device 13. The other plastic lens 126 is attached on the second lens surface of the base lens, and is surrounded by another piezoelectric device 13. The plastic lens 124, 126 can be made of optically plastic materials, such as polycarbonate (PC), polystyrene (PS), polymethylmethacrylate (PMMA), polydimethylsiloxane (PDMS), etc.

The base lens 122 typically includes two opposite protruding portions 1222 projecting from two sides thereof. The barrel 14 defines two grooves 142 corresponding to the protruding portions 1222. Thus, the base lens 122 is secured in the barrel 14 with the protruding portions 1222 being engaged in the grooves of the barrel.

It is understood that, the composite lens may have a base lens 122 and only one plastic lens integrally formed on one surface of the base lens 122. In addition, the plastic lens can be attached on the base lens 122 using a glue; and the base lens could also be a plastic lens.

Each of the piezoelectric devices 13 typically includes a ring-shaped piezoelectric member 133, and two ring-shaped electrodes 132 attached to opposite sides of the piezoelectric member 133. The piezoelectric member 133 can be made of lead zirconate titanate (PZT), or any other piezoelectric materials. Each of the ring-shaped electrodes 132 is connected to a voltage source, therefore, voltages can be applied to the piezoelectric layer 133. The electrodes 132 can be made of an electrically conductive material, such as silver (Ag), gold (Au), etc. The piezoelectric devices 13 can be bonded to the plastic lenses 124, 126 with an adhesive, such as thermally cured epoxy. The piezoelectric devices 13 are disposed between an inner wall of the barrel 14 and an outer surface of the plastic lenses 124, 126 respectively.

It is well known to those skilled in that art that a piezoelectric material is one of electrostrictive materials, and can convert electrical energy into mechanical energy and vice versa. As such, when a voltage is applied to the piezoelectric device 13, the piezoelectric members 133 of the piezoelectric device 13 will expand or contract along a radial direction thereof. The expansion or contraction of the piezoelectric members 133 results in the radial inward or outward force, which is, in turn, applied to the plastic lenses 124, 126. Thereby, the plastic lenses 124, 126 are deformed. The deformation of the plastic lenses 124, 126 results in the change in the focal length of the plastic lenses 124, 126. Thus, the effective focal length of the variable focal length lens system 10 is adjusted, accordingly. If the voltage is shut off, the variable focal length lens system 10 will recover the original normal effective focal length thereof.

It could be understood by those skilled in the art that, the deformation degree of the plastic lens 124 is proportional to the voltages applied to the piezoelectric device 13, and the adjusting range of the effective focal length of the variable focal length lens system 10 is proportional to the voltages accordingly. That is, the effective focal length of the variable focal length lens 10 can be adjusted continuously.

Alternatively, the deformable lens 12 may be a simple plastic lens, and is surrounded by the piezoelectric device 13.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A variable focal length lens system, comprising:
    a deformable lens; and
    a piezoelectric device surrounding the deformable lens, the piezoelectric device being configured for exerting a radial inward or outward force to the deformable lens so as to deform the deformable lens, thereby changing a focal length thereof, wherein the deformable lens is a composite lens comprising a base lens and a first plastic lens attached on a first lens surface thereof, the piezoelectrical device surrounding the first plastic lens.

2. The variable focal length lens system of claim 1, wherein the base lens is a glass lens.

3. The variable focal length lens system of claim 1, wherein the first plastic lens is made of a material selected from the group consisting of polystyrene, polymethylmethacrylate, polycarbonate, and polydimethylsiloxane.

4. The variable focal length lens system of claim 1, wherein the composite lens further comprises a second plastic lens attached on a second lens surface of the base lens opposite to the first lens surface.

5. The variable focal length lens system of claim 4, further comprising another piezoelectric device, the second plastic lens being surrounded by another piezoelectric device.

6. The variable focal length lens system of claim 1 further comprising a lens barrel, wherein the deformable lens and the piezoelectric device are arranged in the lens barrel.

7. The variable focal length lens system of claim 1, wherein the piezoelectrical device comprising:
    a piezoelectric member; and
    first and second electrodes positioned on opposite sides of the piezoelectric member.

8. A variable focal length lens system, comprising:
    a deformable lens; and
    a piezoelectric device surrounding the deformable lens, the piezoelectric device being configured for exerting a radial inward or outward force to the deformable lens so as to deform the deformable lens, thereby changing a focal length thereof, wherein the piezoelectrical device comprising: a piezoelectric member; and first and second electrodes positioned on opposite sides of the piezoelectric member.

* * * * *